United States Patent [19]

Nakamura et al.

[11] Patent Number: 4,954,906
[45] Date of Patent: Sep. 4, 1990

[54] POSITION CONTROL SYSTEM FOR A MAGNETIC STORAGE DEVICE USING A SMALL SIZED DISK

[75] Inventors: Yoshihiro Nakamura; Kazuya Takahashi; Atsuki Ichinose; Testuya Mino, all of Suwa, Japan

[73] Assignee: Seiko Epson Corporation, Tokyo, Japan

[21] Appl. No.: 116,293

[22] PCT Filed: Mar. 3, 1987

[86] PCT No.: PCT/JP87/00132

§ 371 Date: Nov. 4, 1987

§ 102(e) Date: Nov. 4, 1987

[30] Foreign Application Priority Data

| Mar. 4, 1986 | [JP] | Japan | 61-46713 |
| Apr. 1, 1986 | [JP] | Japan | 61-74796 |
| Apr. 1, 1986 | [JP] | Japan | 61-74800 |
| Apr. 30, 1986 | [JP] | Japan | 61-100164 |

[51] Int. Cl.⁵ .................. G11B 5/596; G11B 21/10
[52] U.S. Cl. .................. 360/77.08; 360/78.13; 318/685
[58] Field of Search .................. 360/75, 77, 78, 77.02, 360/77.04, 77.07, 77.08, 78.04, 78.08, 78.13; 318/685, 696

[56] References Cited

U.S. PATENT DOCUMENTS

| 4,135,217 | 1/1979 | Jacques et al. | 360/77 |
| 4,581,567 | 4/1986 | Yanagawa et al. | 318/696 |
| 4,622,603 | 11/1986 | Mizunuma et al. | 360/78 |
| 4,636,884 | 1/1987 | Hattori et al. | 360/78 |
| 4,660,106 | 4/1987 | Harrison et al. | 360/77 |
| 4,737,869 | 4/1988 | Sugaya et al. | 360/77 |
| 4,775,902 | 10/1988 | Trovato et al. | 360/78 |

FOREIGN PATENT DOCUMENTS

| 52-42206 | 4/1977 | Japan . |
| 52-080814 | 7/1977 | Japan . |
| 59-033671 | 2/1984 | Japan . |
| 59-180269 | 12/1984 | Japan . |
| 60-34797 | 3/1985 | Japan . |
| 60-87477 | 5/1985 | Japan | 360/78 |
| 60-160399 | 8/1985 | Japan . |
| 60-261080 | 12/1985 | Japan . |

Primary Examiner—Alan Faber
Assistant Examiner—Steven R. Garland

[57] ABSTRACT

The present invention provides an improved positioning control system for a hard disk device, wherein a servo burst signal for the head positioning is stored at two points on the circumference of each track of the disk in order to eliminate the recording density, thereby performing fine positioning of a two phase step motor by microstepping. The step motor is connected to a rotary type actuator through a steel belt, thereby moving the head in a radial direction along the disk by driving the step motor. The step motor is excited every $\pi/4$ (rad) of the two phase electrical phase angle from a positon of $\pi/8$ (rad) of the two phase electrical phase angle, at the time of exciting. The measurement of the hysteresis of the step motor and the measurement of an off-set value of the step motor are performed at the time of excitement the device, thereby realizing the correction of the measurement of track head deviation from a track center during operation.

11 Claims, 9 Drawing Sheets

POSITION CONTROL SYSTEM FOR A MAGNETIC STORAGE DEVICE USING A SMALL SIZED DISK

BACKGROUND OF THE INVENTION

The present invention relates to an external auxiliary magnetic storage device, and in particular, to a magnetic storage device using a small sized disk.

The development of lightweight, portable, low power consuming computers and peripherals has resulted in greater advances in miniaturization of hard disk devices. The disk diameter has been reduced from 14 inches, to 8 inches, to 5.25 inches and even as small as 3.5 inches. The miniaturization of disk diameters requires a corresponding increase in disk storage density and track density as well as driving systems for tracking such disks.

Conventional micro-hard disk driving systems are known from U.S. Pat. No. 4,568,988 which provides a disk drive system compatible with 3.5 inch disks. A rotary actuator is coupled to a step motor by a steel belt so that the rotation of the step motor causes movement of the rotary actuator. However, this is an open loop system which does not achieve positioning control with respect to the recording track on the disk surface. Accordingly, the tracking head positioning error tends to increase. Additionally, such a system does not lend itself to the decreasing of track density. The two phase of the step motor are uniformly excited and therefore, the device becomes restricted in the number of tracks which can be traversed by the head due to the step angle of the step motor and the structure of the steel belt.

A method and apparatus for recording and detecting information while decreasing track density which is utilized in storage devices operating on large size 14 inch and 8 inch disks is known from U.S. Pat. No. 3,534,344. This method is known as the dedicated surface servo method in which data for head positioning is recorded on one surface, the servo surface, of the disk. Control of the voice coil motor is performed based upon the stored positioning data so that a positioning scheme for the actuator is provided. However, in this method, because one surface of the disk is utilized for servo data, it can not be used for normal data storage, reducing the storage capacity and efficiency for the device. This problem is amplified in small sized devices which utilize only one or two disks. Additionally, the control circuit becomes more complicated increasing the cost of the overall device.

A method for solving the position detection problem for a track following a servo system utilizing a sector servo system is known from U.S. Pat. No. 3,593,333. Each sector is a divided unit of data provided within each disk track. Each sector normally has a storage capacity of 256, 512, or 1024 bytes. Therefore, there are ten to several tens of sectors within one track. A servo region containing the servo data is provided in the leading edge and a trailing edge of each sector so that positioning control is performed in each sector and a special servo surface is no longer needed reducing the useless portion of the disk recording surface. However, in this system, it is required that there be a method for detecting the servo region accompanying each sector and since each servo region corresponds to a respective sector, it is impossible to change the size and number of sectors after shipment of this device, i.e. once these sectors have been determined.

A data transducer position control system for rotating disk data storage equipment utilizing a wedge servo region or index servo system so that the servo region for positioning is provided at one portion in each track of the disk surface is known from U.S. Pat. No. RE. 32075. This method performs head positioning correction each rotation of the disk. A predetermined timing region acts as the servo region based upon an index signal which is generated once each rotation of the disk. The size of this sector is no longer restricted as in the previous sector servo system, a complicated control system is no longer required and the working efficiency due to useless recording surfaces is no longer a problem as was in the dedicated servo system. However, due to the fact that only one correction occurs per rotation, the head position can not be amended where the eccentricity of the disk changes over time and as the disk rotates the change occurs in a non-repeating manner. For example, in the case of the development of the eccentricity after shipment in which the head deviates towards the outer region of the disk in one portion of the circumference but will deviate inwardly on the opposite side. Accordingly, it is impossible to prevent such error by correcting the head only once per each rotation.

Accordingly, a position control system for a magnetic storage device using a small sized disk which overcomes the shortcomings of the prior art is desired.

SUMMARY OF THE INVENTION

A positioning control system for a magnetic storage device includes a disk having a plurality of tracks and at least two servo regions which contain positioning data. This positioning data is recorded in each track. A read/write head for reading the data stored within each track is mounted about a pivot axis. An actuator includes a head arm having the read/write head thereon and a rotary arm are pivotably mounted about the pivot axis on opposed sides of the pivot axis. A step motor drives the head arm through step angles, each step corresponding to a track across the disk. A steel belt is wound about a capstan provided at the output axis of the step motor and secured at the apex of the rotary arm, coupling the step motor to the head arm. The center of gravity at the movable portion of the actuator, including the head arm and the rotary arm can be set on the pivot axis without the addition of added weight. An in line type of head having a load suspension which extends in a direction tangential to the track with respect to a head slider is utilized allowing miniaturization of the actuator, miniaturization of the entire device as well as high speed access to a track.

A chopper driving circuit provides a constant current for driving the step motor. A servo demodulation circuit detects an amplified servo burst signal corresponding to the reading of the data contained at the servo region. An operational circuit receives the detected servo burst signal and calculates the deviation between the servo burst signal and the track center of the head. A digital to analog ("D/A") converter produces an excitement current value for each phase of the step motor which is input to the chopper driving circuit. The chopper driving circuit performs micro-stepping in accordance with the calculated deviation to position the head at least twice during each rotation of the disk. To move the head, the electric phase angle $\pi/4$ rad is divided into portions to succeedingly excite the step motor at the time of acceleration or deceleration of the step motor to provide smooth movement when increasing or decreasing speed.

Accordingly, it is an object of the invention to provide an improved position control system for a magnetic storage device utilizing a small sized disk.

A further object of the present invention is to provide a positioning control system utilizing a step motor in which the hysteresis peculiar to the step motor and the offset of the step motor driving circuit are automatically compensated for.

Another object of the present invention is to provide a positioning control system which provides more accurate positioning control.

Yet another object of the present invention is to provide a position control system driven by a step motor in which the step motor is excited every $\pi/4$ rad from the position of $\pi/8$ rad of the electric phase angle of the two phase step motor to correspond with each track of the disk, reducing the step angle of the step motor.

Yet another object of the invention is to provide a position control system in which a step motor is accelerated or decelerated having a phase angle corresponding to an intermediate position of each track so that the step motor is excited after acceleration or deceleration to provide smooth speed acceleration and smooth speed deceleration allowing for high speed track access.

Still another object of the present invention is to provide a position control system including a disk having servo sectors which allow positioning of the head at least twice each rotation of the disk maintaining accurate positioning of the control head.

Yet another object of the present invention is to provide a positioning control system in which the interval of each servo burst signal is adequately determined allowing arbitrary usage of sector lengths of data for recording in an area from 256 bytes to 1024 bytes realizing the maintenance of a degree of freedom during the use of the device.

A further object of the present invention is to provide a position control system in which the pitch accuracy of each track and the positioning accuracy of the magnetic head are obtained while the controllability of the angle position with respect to the current value at each track position can be uniformly made.

Still other objects and advantages of the invention will in part be obvious and will in part be apparent from the specification.

The invention accordingly comprises the features of construction, combination of elements and arrangement of parts which will be exemplified in the constructions hereinafter set forth and the scope of the invention will be indicated in the claims.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

Figure 1:
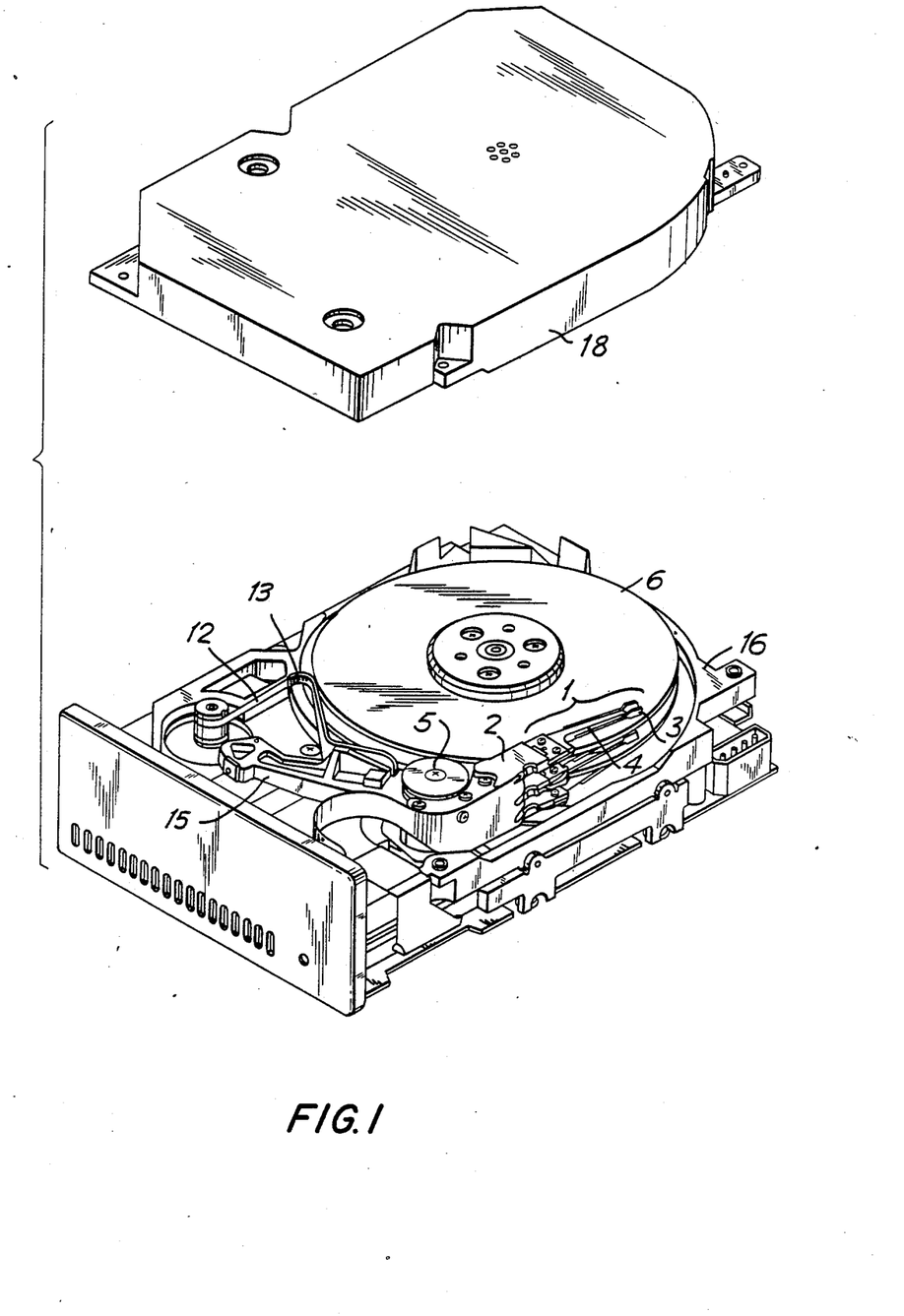
FIG. 1 is a perspective view of a magnetic storage device constructed in accordance with the present invention with the top cover removed.
Figure 2:
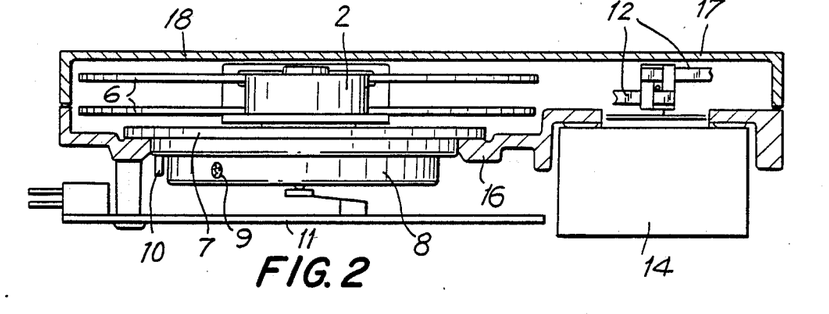
FIG. 2 is a sectional view of the magnetic storage device.

Reference is first made to FIGS. 1 and 2 in which a position control system for positioning a read/write head relative to tracks on a magnetic disk is provided. A base frame 16 includes a pivot axis 5 extending therefrom. An actuator includes a head arm 2 pivotably mounted about the pivot axis 5. A magnetic head 1 is attached to head arm 2 and includes a load suspension projecting in the tangential direction of track 310 (FIG. 4a) and a slider 3 positioned at the distal end of load suspension 4. A rotary arm 15 is pivotably mounted on pivot axis 5 at a position opposed to head arm 2 and coupled to head arm 2 so that both head arm and rotary arm 15 rotate about axis 5. The moveable portion of the actuator includes magnetic head 1, head arm 2, and rotary arm 15. The center of gravity of the rotating portion, rotary arm 15 and head arm 2 is pivot axis 5 preventing rotation of the movable actuator portion due to external impact forces.

A step motor 14 is mounted within base frame 16. A capstan 17 is provided on an output axis of step motor 14. A steel belt 12 is wound about capstan 17 along its length. Steel belt 12 is attached at one end to rotary arm 15. A steel belt preload spring 13 is formed as an extension of rotary arm 15 and is coupled to steel belt 12 to tension the end of steel belt 12 not attached to rotary arm 15.

A spindle motor 7 is positioned within base frame 16, a spindle 20 supports magnetic disks 6 and is rotated by spindle motor 7 so that spindle motor 7 rotates magnetic disk 6 at a constant speed. Spindle motor 7 includes a rotor 8. An index magnet 9 is attached to the outer periphery of rotor 8. An index sensor 10 is affixed to spindle motor 7 at a stationary position and senses magnet 9 as it passes with the rotation of rotor 8 thereby generating one motor index signal per rotation. A cover 18 fits over base frame 16 to provide a closed unit.

Figure 3:
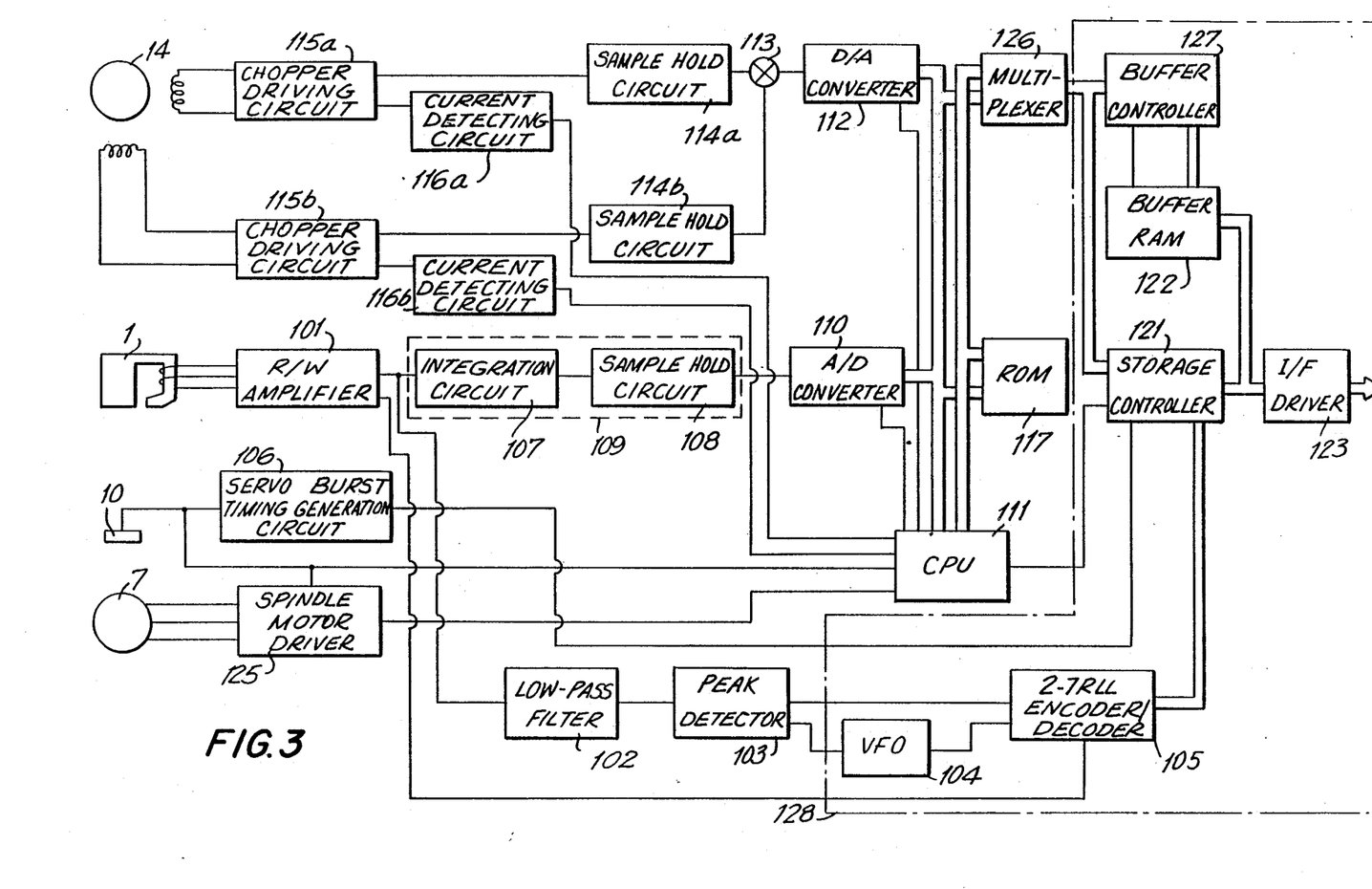
FIG. 3 is a block diagram of an electronic circuit for positioning a read/write head constructed in accordance with the invention.

An electronic circuit for controlling spindle motor 7 and step motor 14 is provided on a circuit board 11. As seen in FIG. 3 the circuit includes a read/write ("R/W") amplifier 101 which receives an input from and provides an output to magnetic head 1. This allows control of the writing current, the initial amplification of the read signal input from magnetic head 1 and the switching of magnetic head 1. The amplified read signal output by R/W amplifier 101 passes through a low pass filter 102 to be converted into digital data by peak detector 103. Further, a clock signal and original data signal are broken down by a variable frequency oscillator ("VFO") 104 due to the synchronism between the clock signal and original data signal. The data signal is in 2-7 Run Length Limited ("RLL") code requiring that the data be decoded to a Non-Return To Zero ("NRZ") signal. A 2-7 RLL encoder/decoder 105 receives the input from VFO 104 and peak detector 103 and decodes the 2-7 RLL code. The decoded data is then transferred to a storage controller 121 which determines where the data is to be stored. Upon the input of magnetic head 1, the data is stored in a buffer Random Access Memory ("RAM") 122 in accordance with instructions from storage controller 121. The stored data is then sent out to the host system through interface ("I/F") line driver 123.

In contrast, data written onto disk 122 is input through I/F line driver 123 and stored in buffer RAM 122. Storage controller 121 causes the data to be encoded by 2-7 RLL encoder/decoder 105. The data is encoded into 2-7 RLL code. This resulting data is then transmitted to R/W amplifier 101 where it is then stored on disk 6 by read/write head 1.

Figure 4A:
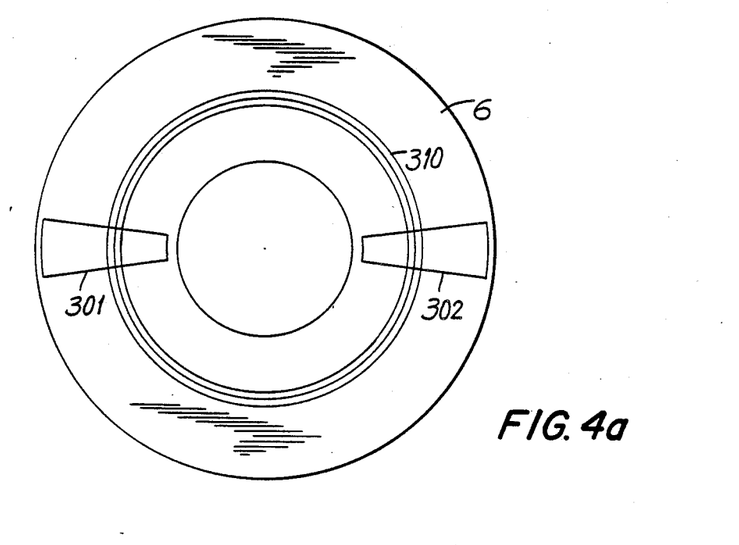
FIG. 4a is a top plan view of a magnetic disk detailing the positioning of the servo burst sectors on the disk surface.
Figure 4B:
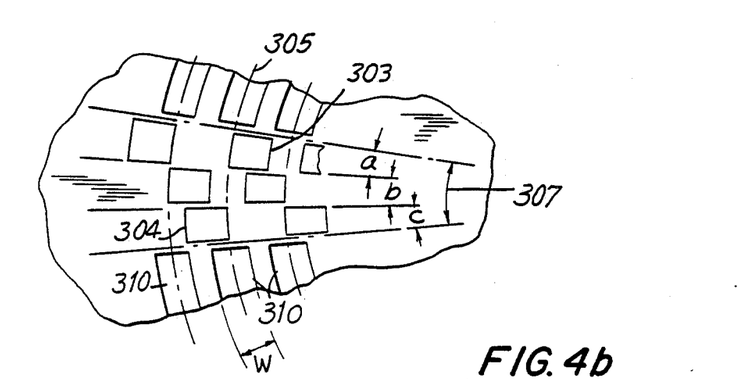
FIG. 4b is an enlarged view of a servo burst sector.

Reference is now made to FIGS. 4a and 4b in which the format of magnetic disk 6 is provided. Each disk 6 includes a plurality of tracks 310. Disk 6 includes a first servo region 301 and a second servo region 302 on the disk surface. Data can not be written in either servo region. Servo burst data formed as servo bursts 303, 304 are written within a servo region 307 (FIG. 4b). Servo bursts 303, 304 are written off center from a track center 305 of each track 310. Each track has a width w and each servo burst 303, 304 is off center of track 310 by a half a width or one half w. Servo burst 303 are off center towards the inside of magnetic disk 6 traveling in the radial direction while servo burst 304 are off center towards the outside of magnetic disk 6 traveling in the radial direction. Servo region 307 is divided into three sub-servo regions a, b. and c. The a region and c region are used for determining track center 305. A servo burst pair 303, 304 is written adjacent each track 310 and where suitable two sub-regions are selected from the three sub-servo regions a, b, and c to avoid interference with each adjacent track.

Figure 5:
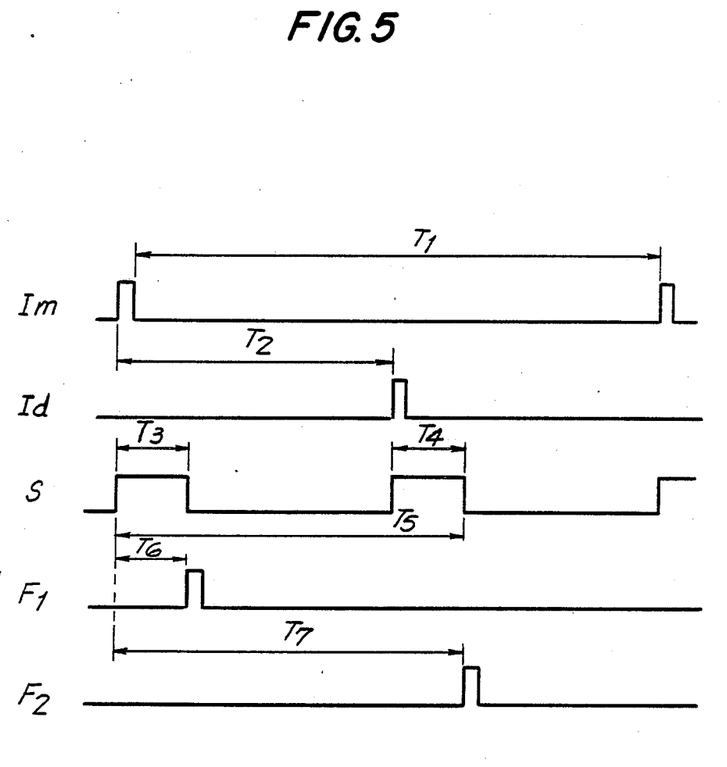
FIG. 5 is a timing chart representing the servo burst signal.

A spindle motor driver 125 controls the speed of the spindle motor 7. Index sensor 10 generates a motor index signal each rotation of rotor 8. A servo burst timing generation circuit 106 receives signal Im and produces timing signal Id, S, $F_1$ and $F_2$. Each of these signals is produced as a function of signal Im. Each timing signal corresponds to a timing period $T_2$ through $T_7$ which are each interrelated and dependent either directly or indirectly on the timing period $T_1$ between successive Im signals. For example, signal Id is a delayed index signal occurring at time period $T_2$ after the rising edge of signal Im. The delayed index signal Id is generated by the hardware after a time period $T_2$ has passed from the occurrence of Im. S is a servo region signal occurring for a time period $T_3$ and $T_4$ at the occurrence of Im and Id respectively. Time period $T_3$ and $T_4$ of the servo region signal S are the time periods required for generating the servo burst signal and for producing the head position related data. Therefore, the writing of data is prohibited during this time period. Signal $F_1$ and $F_2$ are format signals in which the terminating point of the servo region signal S acts as the starting points for the formatting signals. The format occurs at the time of the initial writing for each track 310 based upon the occurrence of the format initial signals $F_1$ and $F_2$. Accordingly, the above format may be utilized in the same way as a hard disk device having a standard interface such as an ST-506 interface. Accordingly, a conventional IC can be employed as storage controller 121 for controlling the format. Further time period $T_1$ through $T_4$ may suitably selected thereby realizing suitable use for all of the remaining track sector lengths of 256,512 or 1024 bytes.

Magnetic head 1 produces a servo burst signal when reading servo burst 303, 304 and provides an output to R/W amplifier 101 which produces an amplified servo burst signal. The amplified servo burst signal is input to a servo demodulation circuit 109 which outputs the absolute value of the amplified servo burst signal. Servo demodulation circuit 109 includes an integration circuit 107 and sample hold circuit 108. The resulting absolute value of the amplified servo burst signal is converted to the digital signal by an analog to digital ("A/D") converter 110. The digital signal is received by a CPU 111 the timing of the input of the digital signal to CPU 111 is performed in accordance with the index signal Im generated by index sensor 10. The amplified servo burst signal is input into CPU 111 three times, corresponding to the three sub-servo regions a, b and c of servo region 307 with respect to each of the two regions 301, 302, by a trigger signal which is generated by the software of CPU 111. Two amplified servo burst signals are selected from the three received amplified servo burst signals in accordance with the track address at which magnetic head 1 is located. Accordingly, the amount of deviation of magnetic head 1 from track center 305 is detected.

The amount of deviation E can be found by the following formula:

$$E = w[(A_0 - A_i)/(2(A_0 + A_i))]$$

wherein the amplified servo burst signal corresponding to the inside of magnetic disk 6 is $A_i$ and the amplified servo burst signal at the outside of magnetic disk 6 is $A_0$ and recording width is w. Because each servo burst signal 303, 304 is positioned off center of each track 310 by just one half track width of deviation from track center 305, the value of the denominator $A_0 + A_1$ of the formula is not affected by deviation of magnetic head 1 from track center 305. Therefore, a constant denominator value is obtained. As a result, the value $A_0 + A_i$ indicates the amplification value when no deviation occurs. Therefore, utilizing the formula for E the amount of deviation of magnet head 1 may be obtained without relying on the output difference of each track.

Step motor 14 is driven by utilizing two phase bipolar excitement. Reference is again made to FIG. 3 to illustrate the setting of the currents for two phase by polar excitement. A digital value is output by CPU 111. D/A converter 112 converts this digital output to an analog output. The resulting value is output twice and each output is divided into each of two phases by an analog switch 113. The resulting value is maintained in either of two sample hold circuits 114a or 114b dependent upon switch 113. The value held by sample holding circuit corresponding to each phase is output to a first chopper driving circuit 115a or second chopper driving circuit 115b which acts as the constant current driving system and transmits the current to step motor 14.

Figure 7:
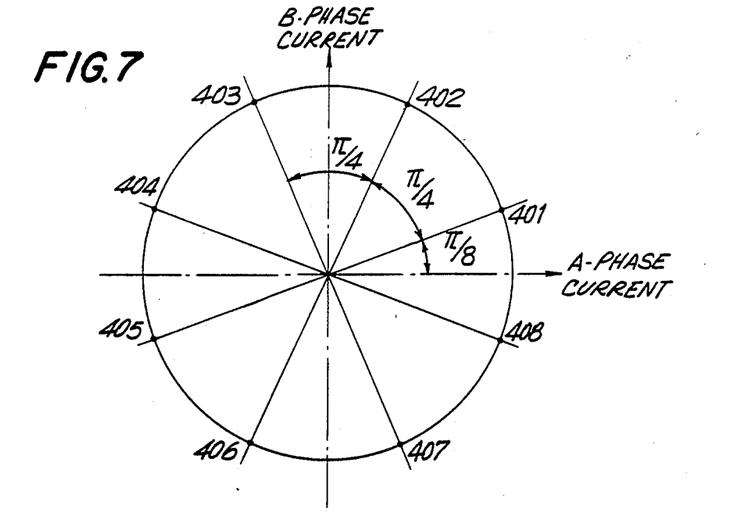
FIG. 7 is a phase diagram showing the electrical phase angle of the two phase excitement of the step motor in accordance with the present invention.

Reference is now made to FIG. 7 in which the current phase diagram is provided. The balance of the current flowing within each of the two phases is within the positions of 401 through 408 where the initial point of the phase angle of the electrical angle is deviated by $\pi/8$ radiance when compared with the single phase excitement method or the two phase uniform excitement method. Accordingly, the dividing number is double that in the two phase uniform excitement method.

Figure 6:
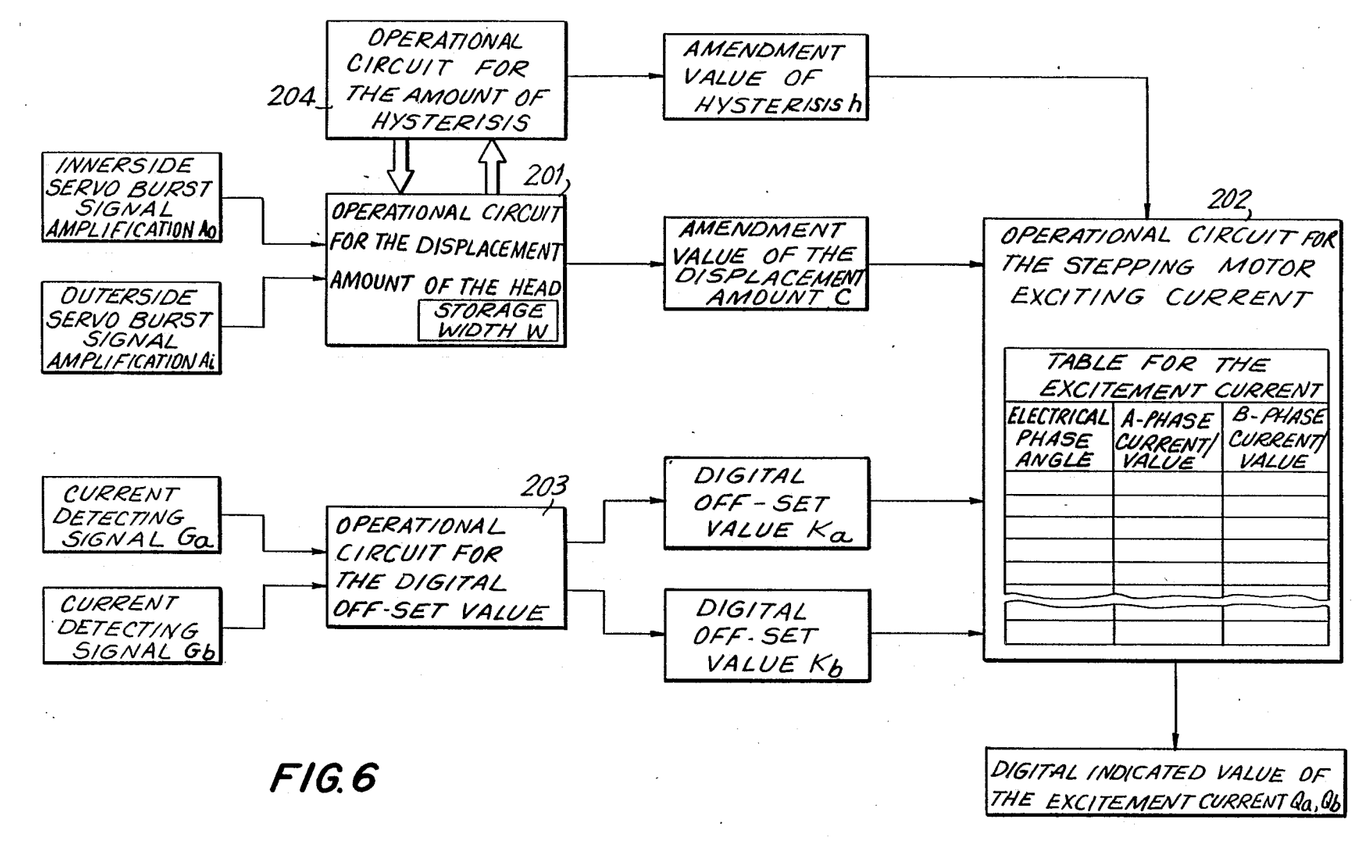
FIG. 6 is a block diagram of the operational circuit constructed in accordance with the invention.

Reference is now made to FIG. 6 in which the operation of the magnetic head 1 is described. A current detecting circuit 116a or 116b detects the current from step motor 14 and produces current detecting signal $G_a$, $G_b$. An operational circuit for the digital offset value 203 receives current signals $G_a$, $G_b$ and produces digital offset values ka, kb. Simultaneously an operational circuit for the head displacement amount 201 receives signal $A_0$ corresponding to the outside amplified servo burst signal and $A_i$ corresponding to the amplified inside servo burst signal and provides amendment value, c, corresponding to the magnetic head displacement amount and another output which is received by an operational circuit for determining the amount of hysteresis 204 which provides feedback to operational circuit 201 while also outputting a value h corresponding to the hysteresis correction value. An operational circuit for the step motor excitement circuit 202 receives the hysteresis value h, amendment value c, digital offset values ka, kb and determines the electrical phase angle required to drive step motor 14 to correct magnetic head 1.

Displacement value c corresponds to an amendment value based on electric phase angle corresponding to the deviation of magnetic head 1, i.e., E. Digital indicated values Qa, Qb corresponding to the excitement current for each phase are selected from a table of excitement currents contained within operation circuit 202. The table contains the corresponding phase angle. The digital value is input to D/A converter 112 for providing an output signal to correct step motor 14.

Figure 8A:
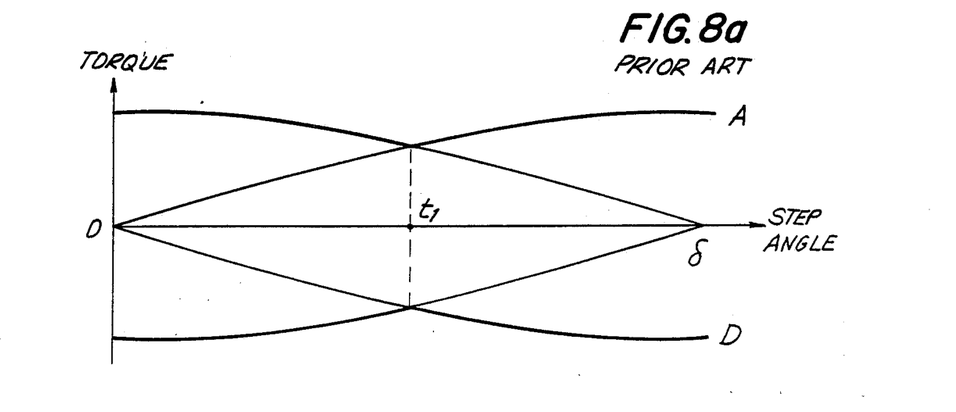
FIG. 8a is a phase diagram showing the excitement condition of the step motor in accordance with prior art.
Figure 8B:
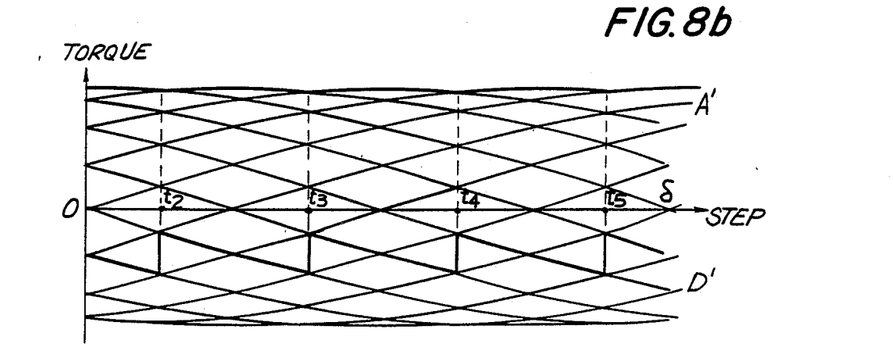
FIG. 8b is a phase diagram showing the excitement condition during track seeking in accordance with the present invention.

With the above construction, twice the number of tracks may be accessed when compared to using only a two phase excitement method. At the same time, uniform variation of the angle in accordance with the variation of the balance of the current at each position can be obtained when compared to those devices utilizing a single phase alternated with a two phase driving current. Additionally, during acceleration or deceleration, when moving magnetic head 1, the interval for switching excitement current between positions 401 through 408 may be made short or long as needed. During acceleration or deceleration the interval between phase changes is divided by an amount greater than $\pi/4$ rad of the electrical phase angle in order to perform excitement. As seen in FIG. 8a in the conventional positioning system, when the step motor was rotated through a step angle corresponding to a single track the excitement current was switched on at time t1. Therefore, the torque would vary by a large margin such as point A during acceleration or a point D during deceleration. However, as seen in FIG. 8b when the step angle corresponding to a single track is caused to rotate by providing an excitement signal which is divided into four time periods t2-t5, the torque A' at the time of acceleration is always provided at a maximum and torque D' at the time of deceleration is minimized. Accordingly, smooth acceleration or deceleration can be obtained.

Figure 9A:
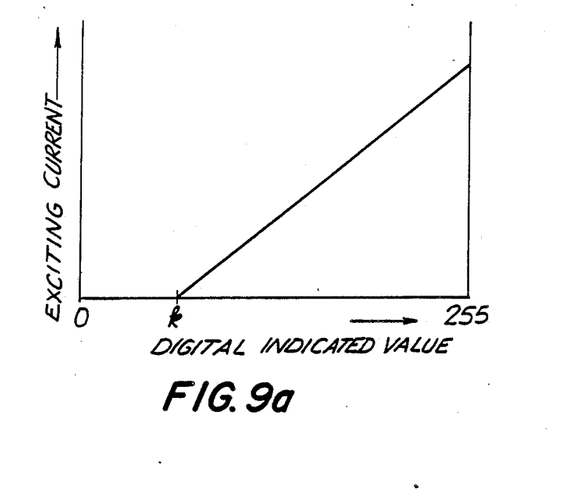
FIG. 9a is a graph representation of the relationship between the digital indicated value input to the D/A converter and the excitement current in accordance with the present invention.
Figure 9B:
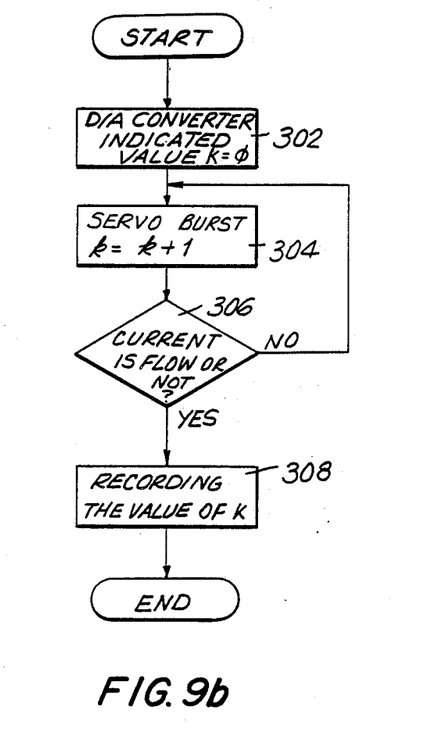
FIG. 9b is flowchart for measuring the digital offset value.

As seen in FIGS. 9a, 9b when the hard disk device is initially operated, the digital values indicated by D/A converter 112 are initialized in a step 302 setting a variable k equal to an initial value $\emptyset$. The value for k is then increased by 1 by the digital offset value operational circuit 203 in a step 304. Current detecting signals Ga and Gb are detected by current detecting circuit 116a, 116b to determine in each phase whether current is flowing in the coil of step motor 14 in a step 306. The digital indicated value is stored as the digitalo offset values ka, kb at the time when current begins to flow in a step 308. This operation is performed in each of the two phases. When magnetic head 1 moves and positioning is to be controlled, as shown in FIG. 6, the correct control of each ratio of the excitement current is made possible by inputting the value of digital offset values Ka and Kb which are added to D/A converter 112 providing a more correct position control.

Figure 10A:
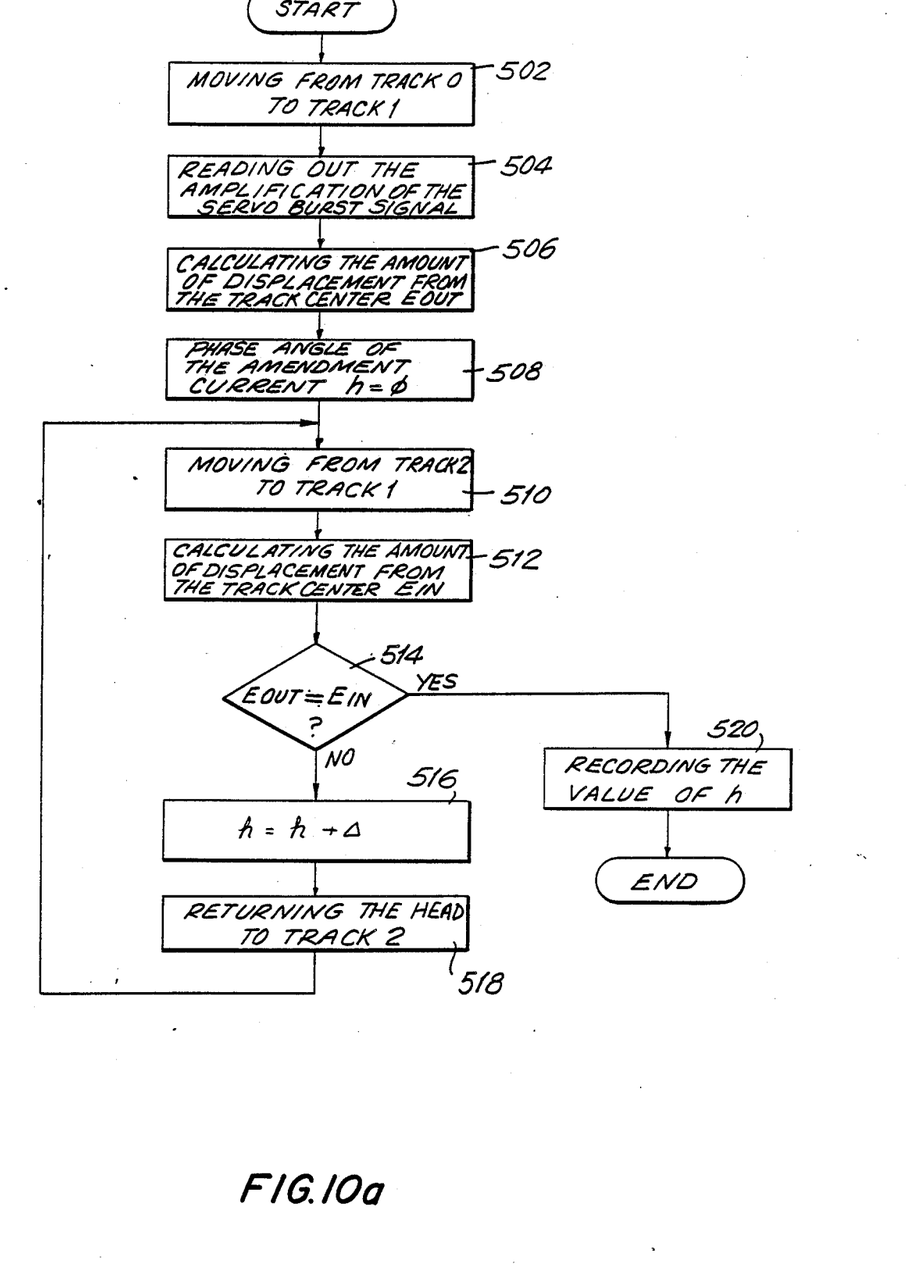
FIG. 10a is a flowchart for measuring the hysteresis of the step motor in accordance with the present invention.
Figure 10B:
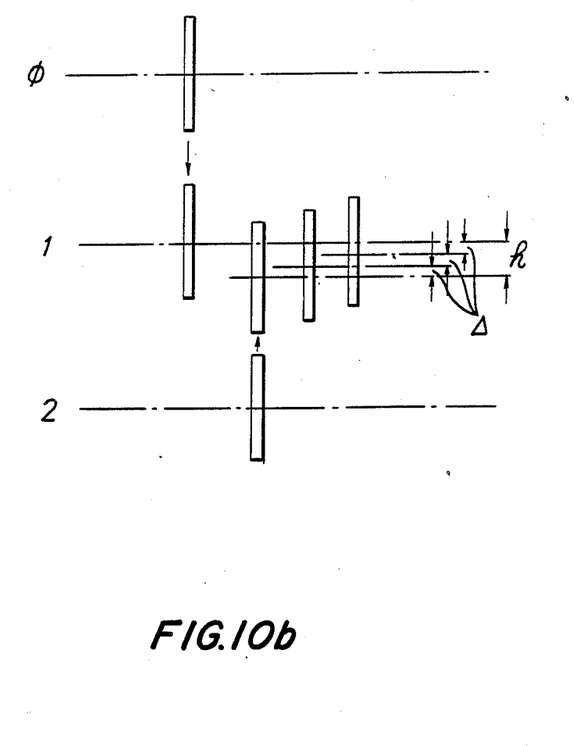
FIG. 10b represents the hysteresis condition within the step motor

Additionally, when starting the hard disk device, magnetic head 1 is moved from an adjacent track, for example tracks 0 and 2 as shown in FIGS. 10a and 10b in a step 502. The amplified servo burst signal is produced by R/W amplifier 101 in a step 504. The amount of displacement from track center 305 towards the outside of magnetic disk 6 is calculated in step 506. An initial amendment current for applying to the step motor to move magnetic head 1 is determined in a step 508 to correct for over movement of magnetic head 1 or to move magnetic head 1 from track 2 to track 1 in a step 510, the amount of displacement from the center towards the inside of magnetic disk 6 is calculated in a step 512. It then determined whether displacement to the outside of the tracks substantially equal to the displacement to the inside of the track in a step 514. If the value of $E_{out}$, the amount of deviation towards the outside surface, is not equal to the amount $E_{in}$, the amount of deviation of the inside surface, then the phase angle value is adjusted by a small increment $\Delta$ in a step 516 and the head is returned towards track 2 in a step 518. The process is then repeated beginning with moving the head from track 2 to track 1 in a step 510 until the deviation away from track center 305 is the same in the outside direction and the inside direction so that the difference between the two equals 0 as determined in step 514. If the difference is 0, then the value h equal to the difference of phase angle is stored as the hysteresis amendment value h at the time when $E_{out}$ is equal to $E_{in}$ in step 520. During normal head movement, this hysteresis amendment value h is added to the deviation amendment value c only when moving from the inside to the outside of magnetic disk 6 thereby changing the excitement current of step motor. Accordingly, with the above method as shown in FIG. 6 it is possible to remove the effect of magnetic hysteresis of the step motor.

Each of the operational circuits and excitement current table as shown in FIG. 6 correspond to the firmware and data found in ROM 117. The function is all performed by CPU 111.

By providing such a positioning control system it is possible to realize accurate positioning control, high speed access and free formatting of the magnetic disk. However, the present embodiment is only an example of the present invention which is applicable to linear actuators, actuators not using a steel belt or the like. Further, the same effect as presented in the present embodiment can be obtained in principle from a step motor comprising multiple phase or unipolar driving. Furthermore, the electric circuit the controller portion 128 marked with a dashed line (FIG. 3) is incorporated into one substrate of the present embodiment, however the same effect may be obtained from a controller portion 128 which is not integrally formed with the device.

It will thus be seen that the objects set forth above, and those made apparent from the preceding description are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A position control system for a magnetic storage device utilizing a small sized disk comprising at least one magnetic disk having a plurality of tracks, a base frame, a spindle, the disk being mounted on the spindle, a spindle motor supported on said base frame for rotating said spindle, at least one magnetic head for writing and reading data from said disk, a head assembly including a load suspension for supporting said magnetic head, an actuator for moving said magnetic head to a predetermined track on said disk, a pivot formed on said base frame, said actuator including an arm, the arm being pivotably mounted about said pivot and supporting the head assembly on one side of said pivot;

and a driving motor for driving said actuator, comprising;

a means for generating a motor index signal which generates one signal each rotation of said spindle in accordance with the rotation of said spindle motor;

a servo data pair having servo data, being located at each of two spaced servo data regions along the circumference of each track at regular time intervals from the occurrence of said motor index signal, said servo data pairs being written on said disk to correspond to a respective track on said disk to position said magnetic head on a track each servo data consisting of at least two servo bursts which are displaced to the inside of said disk and the outside of said disk respectively relative to a track center, said magnetic head producing a servo signal corresponding to respective servo bursts when a servo burst is read by said magnetic head;

a plurality of data regions containing the data, the data being arranged along the circumference of each track between said at least two regions containing servo data, the number of data regions being independent of the number of said servo data regions;

amplifying means for amplifying said servo signal corresponding to each servo burst;

a servo demodulation means for integrating the servo signal based on said each servo burst, performing a sample hold, detecting the amplification of the servo signal and producing an output in response thereto; and operation means for calculating a deviation value between the track center and said magnetic head based upon the output of said servo demodulation means and outputting a desired amendment value; and actuator control means for fine positioning the magnetic head and reducing a position difference between the magnetic head and the track center in response to the desired amendment value.

2. The position control system of claim 1, further comprising a servo burst timing generation means for determining the timing for reading a servo signal during a fixed delay time period from the occurrence of said motor index signal, for prohibiting data writing during the fixed time delay period, and for starting an initial writing of data on each track, wherein the terminating point of the servo burst signal is the starting point of the initial writing of data.

3. The position control system of claim 1, wherein said magnetic head produces a data signal when data is read by said magnetic head further comprising a circuit board, wherein the actuator control means also controls the current of the driving motor to fine position the magnetic head, the servo demodulation means for integrating the servo signal and detect the amplification of the servo signal by the sample hold, and a data separator and data control means for controlling the data signal from the magnetic head, are mounted on said circuit board, whereby each is connected with each other to form the position control system.

4. A position control system for a magnetic storage device using a small sized disk comprising at least one magnetic disk, having a plurality of tracks, a base frame, a spindle, the disk being mounted on said spindle, a spindle motor supported on said base frame for rotating said spindle, at least one magnetic head for writing data and reading data from said disk, a head assembly including a load suspension for supporting said magnetic head, an actuator for moving said magnetic head to a predetermined track on said disk, a pivot formed on said base frame, said actuator including a head arm, the head arm being pivotably mounted about said pivot and supporting the head assembly on one side of said pivot and a driving motor coupled to the head assembly for driving said actuator comprising;

a microstepping driving means for performing the fine positioning of said head to the predetermined track on said disk by controlling said driving motor;

generating means for generating a motor index signal which generates one signal each rotation of said spindle in accordance with rotation of said spindle motor;

a servo data pair having servo data, being located at each of at least two spaced servo data regions along the circumference of each track of the magnetic disk at regular time intervals from the occurrence of said motor index signal, the servo data pairs being written on said magnetic disk to correspond to a respective track on said disk to locate said magnetic head on a track, each servo data region containing a servo data consisting of at least two servo bursts which are displaced to the inside of the magnetic disk and the outside of said magnetic disk respectively relative to a track center, said magnetic recording head producing a servo signal corresponding to each respective servo burst so that the amount of deviation between the magnetic head and the track center and the direction of deviation may be detected;

a circuit means for detecting the amount of deviation and the direction of deviation from the magnetic head to the track center and operating on the amount and the direction of deviation of the magnetic head relative to the track center based on a burst signal; and an amendment means for causing the magnetic head to move to a measurement track from one of the outside and inside of the measurement track and for detecting the amount of deviation of the head relative to the measurement track in both directions of the head movement, operating on the difference between the servo burst signal corresponding to the inside servo burst and the servo burst signal corresponding to the outside servo burst, and inputting a desirable correction amount to the microstepping driving means in accordance with the direction in which a magnetic head moves to seek a track.

5. The position control system of claim 4, wherein the head assembly further comprises a slider, the load suspension extending in a tangential direction relative to the recording track from the slider;

the driving motor being a step motor having an output axis;

a steel belt which is wound around the output axis of said step motor;

a rotary arm connected to said head arm to which an end of said steel belt is secured;

an actuator rotationally movable portion including said rotary arm and the head arm; and a radial bearing located at the center of gravity of said actuator roatationally movable portion.

6. A position control system for a magnetic storage device having at least one magnetic disk, comprising at least one magnetic head for writing data on or reading data from said disk, a spindle, said disk being mounted on said spindle, a spindle motor for rotating said disk, an actuator for moving said magnetic head in a radial direction of said disk, comprising;

a step motor for moving said actuator;

a constant current driving means for outputting a current which corresponds to an input voltage for exciting each phase of said step motor;

a current detecting means for detecting the driving current output by said constant current driving means and producing an output in response thereto;

a D/A converter for applying the voltage input to said constant current driving means in response to a digital input;

a means for detecting the beginning of the current flowing in said constant current driving means in accordance with the output of said current detecting means and increasing the value of said D/A converter from zero by increments of one to produce a digital offset value, further maintaining the resulting digital offset value when current flows in said constant current driving means; and an amendment means for outputting the voltage obtained by adding said digital offset value of said D/A converter to said driving means.

7. The position control system of claim 6, further comprising;

the head assembly having a slider, a load suspension extending in a tangential direction relative to a recording track from the head slider;

a head arm on which said head assembly is secured;

the step motor having an output axis;

a steel belt wound around the output axis of said step motor;

a rotary arm connected to said head arm to an end of said steel belt being secured to said rotary arm;

an actuator rotation movable portion including said rotary arm and the head arm; and a radial bearing located at the center of gravity of said actuator rotation movable portion.

8. A position control system for a magnetic storage device using a small sized disk comprising at least one magnetic disk having a plurality of tracks, a base frame, a spindle, the disk being mounted on said spindle, a spindle motor supported on said base frame for rotating said spindle, at least one magnetic head for writing data on and reading data from said disk, a head assembly including a load suspension for supporting said magnetic head, an actuator for moving said magnetic head to a predetermined track on said disk, a pivot formed on said base frame, said actuator including an arm, the arm being pivotably mounted about said pivot and supporting the head assembly on a side of said pivot, driving motor means for driving said actuator from the opposed side of said pivot, the driving means being a two phase step motor a microstepping driving means for performing the fine positioning of said magnetic head from a predetermined track on said disk by controlling said step motor; and an operational means for supplying a two phase excitement current, wherein the phase angle of said two-phase current is approximately $\pi/8 + n(\pi/4)$ (rad) ($n = 0, 1, 2,...$), to said micro-stepping driving means when said magnetic head is substantially located at the center of the recording track, producing a phase angle deviation value in response to a deviation amount of the magnetic head from a track center, and supplying a digital value proportional to the excitement current of each phase of the step motor corresponding to the phase angle deviation amount to the microstepping driving means when said magnetic head is being finely positioned at the center of the recording track.

9. A position control system for a magnetic storage device utilizing a small sized disk comprising at least one magnetic disk having a plurality of tracks, a base frame, a spindle, said disk being mounted on said spindle, a spindle motor supported on said base frame for rotating said spindle, at least one magnetic head for writing data and reading data from said disk, a head assembly including a load suspension for supporting said magnetic head, an actuator for moving said magnetic head to a predetermined track on said disk, a pivot formed on said base frame, said actuator including an arm, the arm being pivotably mounted about said pivot and supporting the head assembly on one side of said pivot, driving motor means for driving said actuator, the driving motor means including a step motor;

a constant current driving means for exciting each phase of said step motor with a current corresponding to an input voltage;

a common D/A converter for applying the voltage which is input by said constant current driving means of said each phase based on a digital input; and a sample hold means provided in said constant current driving means of said each phase, connected between said constant current driving means and said D/A converter, and a sample hold circuit for maintaining the output voltage value of said D/A converter during a fixed period.

10. A position control system for a magnetic storage device utilizing a small sized disk and comprising at least one magnetic disk having a plurality of tracks, a base frame, a spindle, the disk being mounted on said spindle, a spindle motor supported on said base frame for rotating said spindle, at least one magnetic head for writing data and reading data from said disk, a head assembly including a load suspension for supporting said magnetic head, an actuator for moving said magnetic head to a predetermined track on said disk, a pivot formed on said base frame, said actuator including an arm, the arm being pivotably mounted about said pivot and supporting the head assembly at one side of said pivot, driving motor means supported on said base frame for driving said actuator, the driving motor means including a two phase step motor; operating means for determining the excitement current for the step motor and changing a digital value corresponding to the excitement position to drive the step motor at approximately a maximum driving torque, microstepping driving means for receiving the digital value when the step motor is accelerated, said microstepping driving means supplying an excitement current to each phase of the step motor in accordance with the digital value output from said operation means, thereby driving the step motor and microstepping means for fine positioning said head from a predetermined track on said disk by driving said step motor.

11. A position control system for a magnetic storage device utilizing a small sized disk and comprising at least one magnetic disk having a plurality of tracks, a base frame, a spindle, the disk being mounted on said spindle, a spindle motor supported on said base frame for rotating said spindle, at least one magnetic head for writing and reading data from said disk, a head assembly including a load suspension for supporting said magnetic head, an actuator for moving said magnetic head to a predetermined track on said disk, a pivot formed on said base frame, said actuator including an arm, the arm being pivotably mounted about said pivot and supporting the head assembly at one side of said pivot, driving motor means supported on said base frame for driving said actuator, the driving motor means including a two phase step motor; operating means for determining the excitement current for the step motor and changing a digital value corresponding to the excitement current of each phase of the step motor at approximately a negative driving torque, and microstepping driving means for receiving the digital value when the step motor is decelerated, said microstepping driving means supplying an excitement current to each phase of the step motor in accordance with the digital value output from said operation means, thereby driving the step motor and microstepping means for fine positioning said head from a predetermined track on said disk by driving said step motor.

* * * * *